(12) United States Patent
Khosla et al.

(10) Patent No.: US 7,177,817 B1
(45) Date of Patent: Feb. 13, 2007

(54) AUTOMATIC GENERATION OF VOICE CONTENT FOR A VOICE RESPONSE SYSTEM

(75) Inventors: Ashok Mitter Khosla, Palo Alto, CA (US); Steven Samuel Pollock, Los Altos, CA (US)

(73) Assignee: Tuvox Incorporated, Cupertino, CA (US)

( * ) Notice: Subject to any disclaimer, the term of this patent is extended or adjusted under 35 U.S.C. 154(b) by 895 days.

(21) Appl. No.: 10/319,144

(22) Filed: Dec. 12, 2002

(51) Int. Cl.
*G10L 21/00* (2006.01)
(52) U.S. Cl. .................. 704/275; 704/260; 704/257
(58) Field of Classification Search .............. 704/260, 704/257, 275
See application file for complete search history.

(56) References Cited

U.S. PATENT DOCUMENTS

| | | | |
|---|---|---|---|
| 5,596,634 A * | 1/1997 | Fernandez et al. ..... | 379/210.01 |
| 6,269,336 B1 | 7/2001 | Ladd et al. | |
| 6,292,783 B1 * | 9/2001 | Rohler et al. ................. | 705/2 |
| 6,324,513 B1 * | 11/2001 | Nagai et al. ................. | 704/275 |
| 6,567,805 B1 * | 5/2003 | Johnson et al. ............... | 707/5 |
| 6,895,084 B1 * | 5/2005 | Saylor et al. ............ | 379/88.22 |
| 2001/0049688 A1 * | 12/2001 | Fratkina et al. .......... | 707/104.1 |
| 2002/0154153 A1 | 10/2002 | Messinger et al. | |
| 2002/0188599 A1 | 12/2002 | McGreevy | |
| 2003/0182124 A1 * | 9/2003 | Khan ...................... | 704/270.1 |
| 2004/0083092 A1 | 4/2004 | Valles | |

* cited by examiner

*Primary Examiner*—Tālivaldis Ivars Šmits
*Assistant Examiner*—Leonard Saint-Cyr
(74) *Attorney, Agent, or Firm*—Hahn and Moodley LLP; Vani Moodley

(57) ABSTRACT

In one embodiment, the invention provides a method for building a voice response system. The method comprises developing voice content for the voice response system, the voice content including prompts and information to be played to a user; and integrating the voice content with logic to define a voice user-interface that is capable of interacting with the user in a manner of a conversation in which the voice user-interface receives an utterance from the user and presents a selection of the voice content to the user in response to the utterance.

22 Claims, 4 Drawing Sheets

AUTOMATIC GENERATION OF VOICE CONTENT FOR A VOICE RESPONSE SYSTEM

FIELD OF THE INVENTION

This invention relates to voice applications. In particular, it relates to a method and system for building a voice application.

BACKGROUND

Voice applications are becoming increasingly popular, and can be used in diverse applications such as computer support applications, interactive menu systems, information provisioning applications such as airline time tables, etc.

Such voice response systems generally comprise a voice user-interface which includes voice content such as the prompts and information to be played, and logic or code that is able to receive a user's utterance and determine which portion of the voice content to play in response to the utterance.

One technique for developing the voice user-interface is to develop the voice content and the logic in a single step. This results in the voice content being inextricably interwoven with the logic which makes it difficult to change the voice content after creation of the voice application.

Further, in cases where the voice content comprises a large amount of information, structuring the content into a form that can be played by the voice user-interface can be time consuming and tedious.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
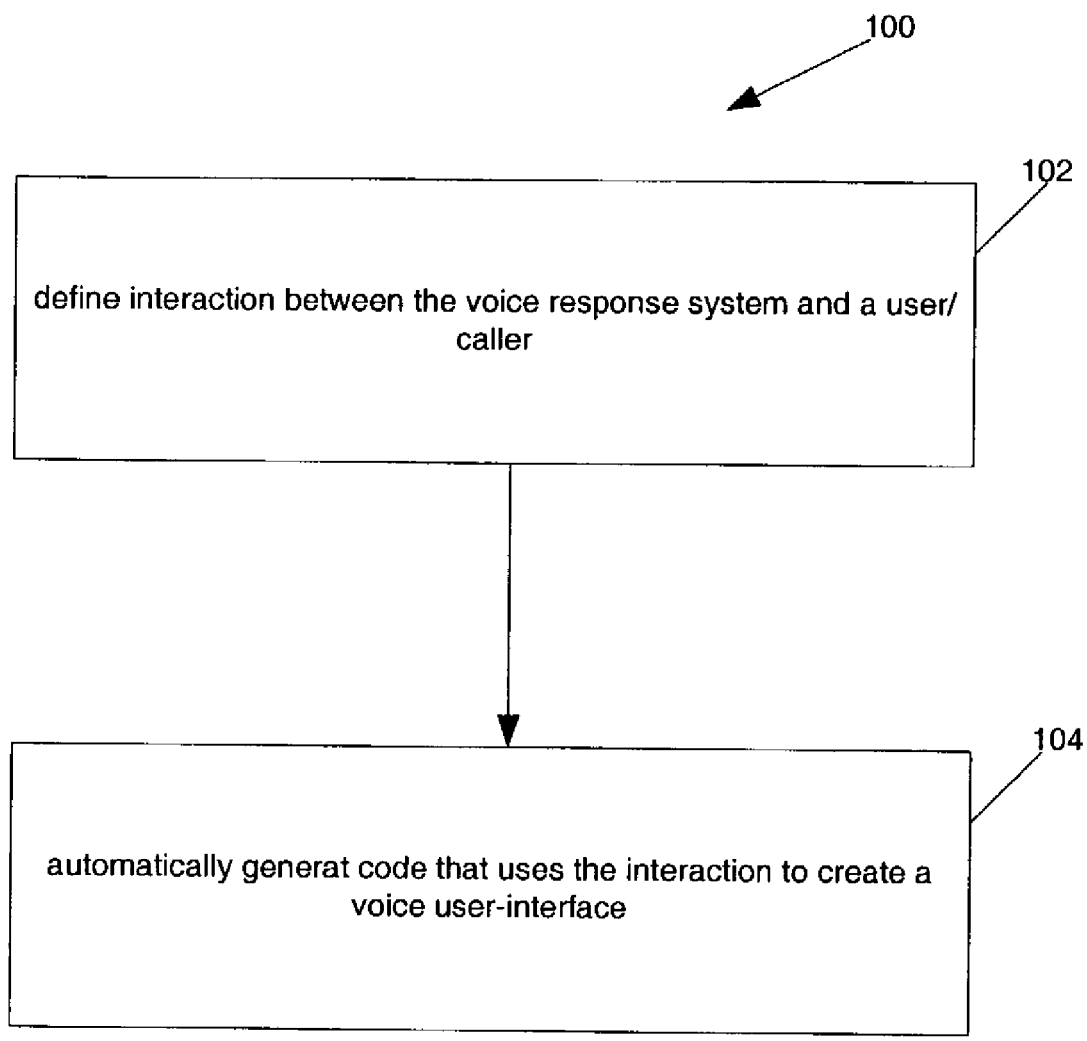
FIG. 1 shows a flowchart of operations performed in building a voice response system in accordance with one embodiment.

Referring to FIG. 1 of the drawings, reference numeral 100 generally indicates a method for building a voice response system in accordance with one embodiment of the invention. As will be seen, at block 102 an interaction is defined between the voice response system and a user. The interaction includes voice content such as text elements, e.g., prompts and information to be played to the user in response to an utterance by the user and the utterances by the user. The text elements and the utterances are arranged in the form of a pseudo-dialog wherein the text elements to be played in response is identified. In some embodiments, the voice content is advantageously developed automatically using computational and linguistic techniques, as will be described in greater detail below.

After execution of block 102, block 104 is executed wherein the interaction is integrated with logic or code to create a voice user-interface that controls playback of the voice content. The operations performed at block 104 are performed automatically. One advantage of the method illustrated in FIG. 1 of the drawings is that by developing the voice content independently of the logic to control playback of the voice content, it is possible to make subsequent changes to the voice content and to simply re-integrate the voice content with the logic. This allows for the subsequent changes to the voice content to be made relatively easily when compared to making changes to the voice content when the voice content and the logic to create the voice user-interface have been developed simultaneously during a single coding step.

Further, because the operations performed at block 102 may be performed automatically, it is possible to produce voice content from relatively large text documents which may represent, for example, a body of knowledge such as a trouble shooting or help guide. Other advantages of a present invention will be apparent from the discussion below.

Figure 2:
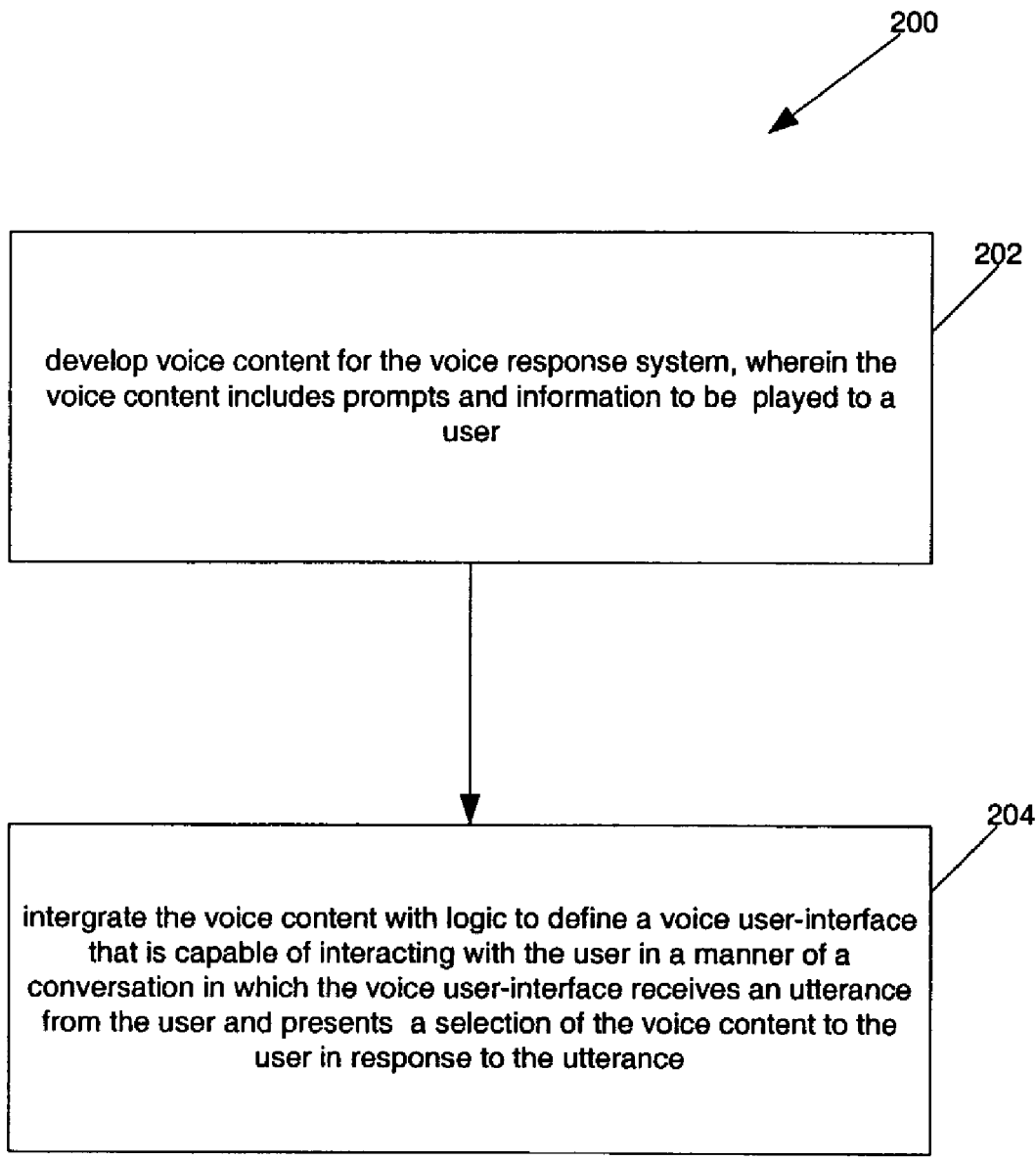
FIG. 2 shows a flowchart of operations performed in building a voice response system in accordance with another embodiment.

Referring now to FIG. 2 of the drawings, reference numeral 200 generally indicates another embodiment of a method for developing a voice response system. As will be seen, at block 202 voice content for a voice response system is developed and at block 204, the voice content in integrated with logic to define a voice user interface. One characteristic of the voice user interface is that it is capable of interacting with a user in a manner of a conversation in which the voice user interface receives an utterance from the user and presents a selection of the voice content to the user in response to the utterance so that the user perceives the interaction with the voice response system as a conversation carried out with a human operator. For example, the conversation may be initiated by the user making a request in the form of an utterance to the voice response system, the voice response system receives the utterance and determines a selection of the voice content to play to the user in response to the utterance. For example, the voice user-interface may select a prompt presenting choices that are available to the user and once the user utters a choice, the voice user-interface selects information to be played to the user based on the choice. As is the case with the method described in the reference to FIG. 1, the method shown in FIG. 2 of the drawings comprises a separate voice content development stage and voice content integration stage.

The methods described with reference to FIGS. 1 and 2 of the drawings may be implemented by a general-purpose computer such as the one described with reference to FIG. 4 of the drawings.

Figure 3:
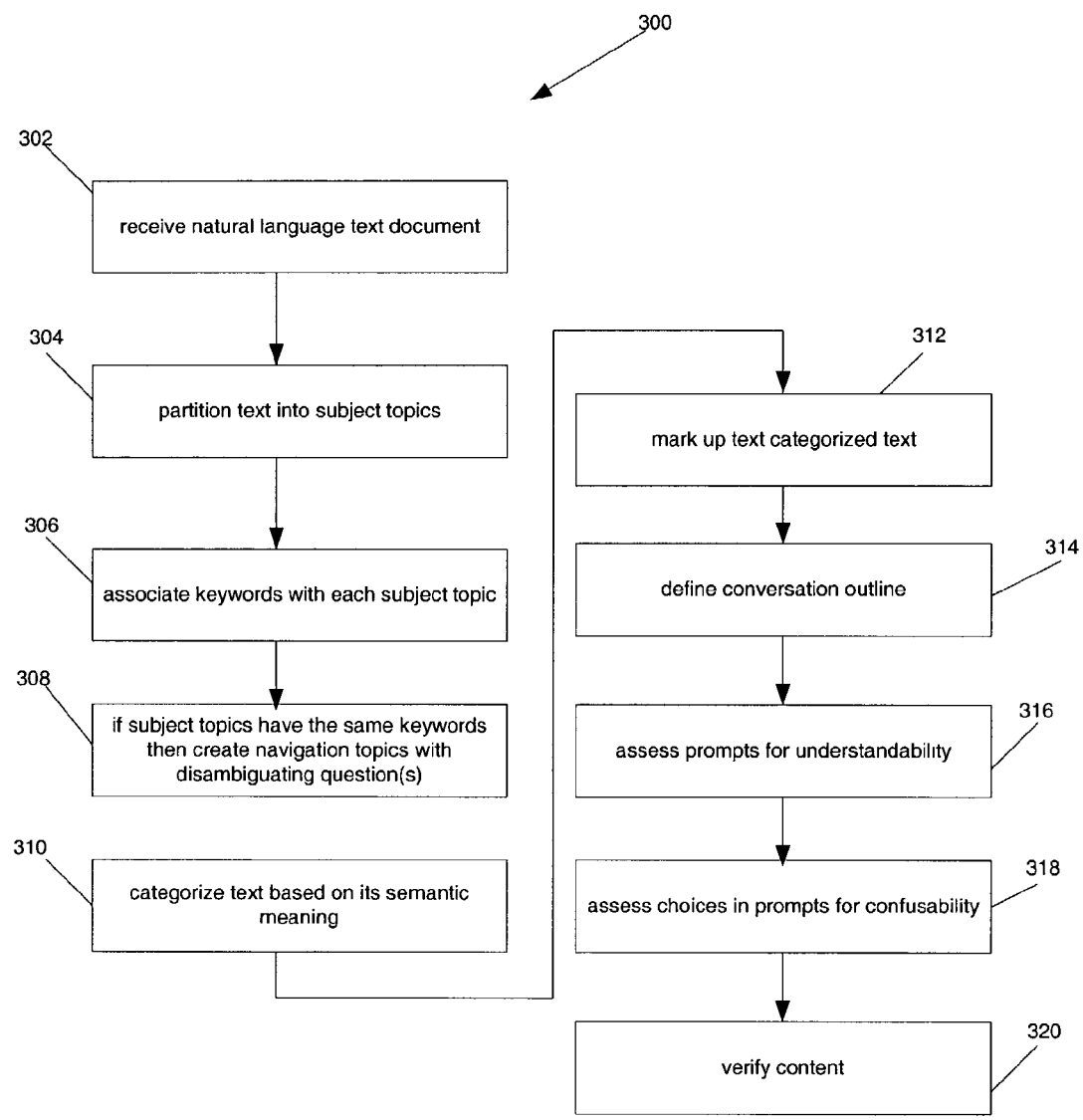
FIG. 3 shows the operations performed in FIGS. 1 and 2 in greater detail.

Referring to FIG. 3 of the drawings, a flowchart 300 is shown. The flowchart 300 comprises operations performed during execution of blocks 102 and 202 of FIGS. 1 and 2, respectively, in accordance with one embodiment of the invention. Referring to FIG. 3, at block 302 the general-purpose computer receives or reads a natural language text document. An example of one such natural language text document is shown in Appendix 1.

At block 304 the text is partitioned into subject topics. This is achieved based on a frequency of occurrence of noun and/or noun phrases in the text. The text for each subject topic a demarcated using a subject topic tag defined in a mark-up language such as Extensible Mark-up Language (XML) or a derivative thereof. Appendix 2 shows the document of Appendix 1 after it has been tagged.

At block 306, a keyword is associated with each subject topic such that when the keyword is altered by the caller (user), a user-interface which uses the voice content is able to retrieve the subject topic associated with the keyword. Typically more than one keyword is associated with each subject topic. Keywords are selected based on a frequency of occurrence of noun/noun phrases within the text for a particular subject topic.

At block 308, for each subject topic having the same or intersecting keywords navigation topics are created. Each navigation topic includes a disambiguating question(s) which is played to the user in order to elicit an utterance or response which then forms a unique keyword which can be used to select the appropriate subject topic. For example, suppose there are three subject topics that relate to the preparation of fish. These topics may relate to "how to cook salmon", "how to cook catfish", and "how to cook trout". It will be appreciated that an utterance by the user that asks "how to cook fish" will need to be disambiguated since it is not known whether the user wishes to cook salmon, catfish, or trout. Thus, a navigation topic will be created which in response to the question "how do I cook fish?" will respond by saying "okay, fish,—I know how to cook three types of fish. To learn more select one of the following choices, salmon, trout, or catfish". A user's response to the choices salmon, trout, or catfish would be used to determine whether to branch to the subject topic "how to cook salmon", "how to cook catfish", or "how to cook trout".

In order to create a navigation topic (for example "how to cook fish") the subject topics are grouped and organized by similarity. For example, if the text document included 30 types of fish, it would be impractical to prompt a caller to select one of the 30 types. Instead, the 30 types of fish may be classified further in terms of, for example, fresh water or sea water, strong taste or mild taste, etc. This would allow the caller to select the type of fish within two or three questions each comprising between two and five choices. In order to perform the grouping by similarity, each subject topic is organized by closeness/similarity. This involves analyzing the content of each topic for common noun/noun phrases and thereafter constructing a keyword frequency vector for each topic. The keyword frequency vector contains patterns of noun/noun phrases, and how often they occur within a subject topic. Each keyword frequency vector that is then sorted by similarity. This may be achieved by normalizing the keyword frequency vector and then performing a dot product of the normalized vectors. This would return the angle between the vectors which is a measure of the similarity between the vectors (angles close to zero indicate close similarity.) In another embodiment, Bayesian probability analysis may be used to determine the probability that two subject topics are similar.

A top level list is then created which contains the topics sorted by similarity for example:
1. How to cook salmon;
2. How to cook tuna;
3. How to cook catfish;
4. How to cook trout;
5. Etc.

The subject topics are grouped based on similarity and difference. For example, there may a large difference between tuna and catfish, but a close similarity between salmon and tuna. After grouping based on similarities and differences the organization may be as follows:
(a) how to cook salmon, how to cook tuna;
(b) how to cook catfish, how to cook trout.

In order to create a disambiguating question for example a question that says, "Would you like to know more about salmon and tuna?", set theory is used. This involves searching for keywords that are in "how to cook salmon" but are not in "how to cook tuna". The most common keyword that is mutually exclusive (here for example, the mutually exclusive keyword might be salmon or tuna, whereas intersecting keywords might be fish, salt water, etc."). The mutually exclusive keywords are then used to build a prompt (in one embodiment the prompt may be randomly selected from a set of templates) such as "okay . . . I know two things about salt-water fish: choices are salmon or tuna" where salt-water fish is the most common noun phrase that is present in both subject topics, and salmon and tuna are the mutually exclusive subjects/noun phrases.

At block 310, each sentence is categorized based on its semantic meaning into one of a number of pre-determined categories. In order to categorize each sentence, the natural language text may be parsed in order to determine its sentence structure or the sentence may be compared to a stored word pattern.

At block 312, the categorized text is marked up based on its semantic and logical meaning. In one embodiment it is achieved using tags defined in a mark-up language such as XML, or a derivative thereof.

In one embodiment, the tags shown in Table 1 below may be applied to structure the text document into a pseudo-dialog or conversation.

TABLE 1

| Category | TAG | Description |
| --- | --- | --- |
| Header | ID | An ID tag is used to identify the text document and is usually its filename. |
| | Title | A Title tag is used to identify topic content. The format of a Title tag is generally a verb followed by nouns, e.g., "Troubleshooting Paper Jams." |
| | Essence | An Essence tag specifies the gist or essence of a topic. The Essence tag may be used to generate prompts for Navigation topics and "guide me" topics. For example: AskWould you like help with Essence1 or Essence2? |
| | Subject | A Subject tag may be used to identify important nouns and noun phrases uttered by the caller to access a particular topic. |
| | Type | A Type tag may be used to identify the topic type, e.g., Subject, Navigation, System, Concept Memory, or Field. |
| Guidance | Intro | An Intro tag may be used to identify a prefacing sentence or a topic summary. |
| | Task | A Task tag may be used to identify "to do" information for the caller. The sentence typically starts with a verb form. |

TABLE 1-continued

| Category | TAG | Description |
|---|---|---|
| | Guidance | A Guidance tag may be used to mark sentences that are not directly task-oriented, but may describe why a task must be performed. |
| | Wait | A Wait tag may be used to insert an execution time for a Task which is needed by the caller. This tag is usually preceded by a Guidance tag stating that the system will wait for a given amount time. |
| | Comment | A Comment tag may be used to identify content that is not part of a topic but may be inserted for an operator/writer's future benefit. |
| Question | Confirm | The Confirm tag may be used for if/then constructions. The answer to a Confirm tag is yes/no. |
| | Ask | An Ask tag may be used for open-ended questions and directed dialogue to present a list of options for the caller to choose from. |
| Answer | Agree | An Agree tag may be applied to responses to a Confirm tag question. Agree tags are yes/no. |
| | Reply | A Reply tag may be used with responses from callers that include keywords/subjects, or a selection from a list presented in an Ask tag question. |
| Navigation | Label | The Label tag may be used to mark a point in the file that the operator/writer may want to reference, either from the current topic, or from another topic. Each Label tag must be given a name. |
| | Jump | A Jump tag may be used to define the point in a topic at which the conversation branches off to another topic. A Jump tag must be followed by a filename, or a filename followed by a # sign and a Label. |
| | PlayTopic | A PlayTopic tag may be used to transfer the flow of conversation from one topic, i.e., the calling topic, to another topic, i.e., the called topic. When the system reaches the PlayTopic tag, it marks its point in the calling topic, plays the called topic, and then returns to the calling topic. The PlayTopic tag must be followed by a topic name, or a topic name followed by a # sign and a Label. |
| | Return | A Return tag may be placed in a called topic to mark the point where the conversation flows back to the calling topic. This may be used when the operator/writer does not want the entire called topic to be played. |
| Concept | Set | A Set tag may be used to set the value of a Concept (variable). The Clear tag may be used to clear the value of a global Concept to NotSet. |
| Memory | Clear | |
| Field | Record | The Record Tag may be used to allow the caller to leave a recorded message accessible for CVR reports. |

A more detailed discussion of each tag in Table 1 is provided below.

1. Header Tags 1.1 ID

This tag identifies a topic with a unique ID, and may be derived from the filename of the document. Subject topic names begin with "ST". Navigation topic names begin with "NT". System topic names begin with "TV". The ID tag cannot have any associated children (prompts can also be classified as parents, children, or neither. If a prompt is dependent upon another prompt being played and on conditions being met, it is called a child prompt; a parent prompt is followed by child prompts that are contingent on it and are played only if certain conditions are met; if a prompt neither leads to other prompts nor is contingent upon a prior prompt it is neither a parent nor a child). ID tags are required but not used as prompts.

| ID | NTPayment |
|---|---|
| ID | STOnlinePayment |

1.2 Title

This tag includes a short phrase summarizing a topic's content. Title tags are usually carefully worded to convey the objective of the topic with clarity and conciseness.

| Title | Making online payments |
|---|---|
| Title | Checking for paper jams |

1.3 Essence

This tag is a brief phrase describing the gist of the topic content. This tag may be used to auto generate "Guide me" topics, and Navigation topics.

| Essence | Paper feed |
|---|---|
| Essence | Paper jams |

Essence information is used to generate clarifying questions in Navigation topics. For instance:

Do you want information on paper feed or paper jams?

1.4 Subject

Subject tags are words or phrases a caller can utter to directly access a topic. Subject tags may be manually entered or automatically generated. Automatically generated subject tags may be edited by an operator.

| Subject | payment, online payment, purchasing |
|---|---|
| Subject | Paper jam, error message |

1.5 Type

This tag identifies a topoic by its type. Allowed topic types are Subject, Navigation, Concept, System and Field.

| Type | Navigation |
|---|---|
| Type | Subject |

2.0 Instruction Tags 2.1 Intro

This tag is an opening statement that summarizes a topic's content or explains its purpose.

| Intro | Making online payments is easy |
|---|---|
| Intro | A paper jam can be cleared quickly |

2.2 Task

This tag is applied to sentences of an explicitly instructive nature. This gives instructions to the caller on how to do something. Task prompts generally start with a verb or an ordinal number.

| | |
|---|---|
| Task | Make sure you are a registered user |
| Task | First, check for blinking indicators |

2.3 Guidance

This tag is applied to descriptive statements or those explaining how or why a task must be done.

| | |
|---|---|
| Guidance | This ensures that your user profile is up to date |
| Guidance | A blinking light is a sign of an ongoing process or an error |

2.4 Wait

The wait tag is used to give the caller time to complete executing an instruction. The system waits for up to a defined period of time, e.g., 2 minutes.

| | |
|---|---|
| Wait | I'll wait while you remove Tray 1 |
| Wait | I'll wait while you look up your model name |

2.5 Comment

Comment tags may be used to make notes, or to add instructions to audio recording, etc.

| | |
|---|---|
| Comment | This is for a friendly female voice |
| Comment | This prompt must be rewritten |

3.0 Question and Answer Tags

3.1 Confirm and Agree

The Confirm tag is applied to questions that have yes/no answers. The answer takes the form of a yes/no response in an Agree tag.

| | |
|---|---|
| Confirm | Would you like to hear about payment? |
| Agree | yes |
| Guidance | .......... |
| Agree | no |
| Guidance | .......... |
| Confirm | Are you currently online? |

3.2 Ask and Reply

The Ask tag may be applied to more open-ended questions that anticipate one or more subjects as a response. Ask also may be applied to questions that present a list of choices to the caller.

The Reply tag marks the possible responses to a question.

| | |
|---|---|
| Ask | I have information on Windows or Macintosh Please state your choice |
| Reply | Windows, 2000, ME, XP, NT |
| Guidance | .......... |
| Reply | Macintosh, Performa |
| Guidance | .......... |

-continued

| | |
|---|---|
| Ask | Please state the subject or its number. 1-Windows, 2-Macintosh, or 3-Handhelds. |
| Reply | one, Windows, ME, XP, NT |
| Guidance | .......... |
| Reply | two, Macintosh, Performa |
| Guidance | .......... |
| Reply | three, third, handheld, organizer |
| Guidance | .......... |

The Ask tag may be followed by a separate child tag with instructions for the Reply.

| | |
|---|---|
| Ask | What operating system do you have? |
| Task | Please state the specific version such as Windows 95, or Red Hat 7 |
| Reply | windows 95 |
| Guidance | .......... |
| Reply | windows 98 |
| Guidance | .......... |

This provides "tapered" help. If the caller understands the Ask, then the caller can provide a Reply immediately. If not, there is a more detailed instruction on how to reply. The caller can back up one prompt at a time, and barge-in during the Ask or the following instruction with a response.

4.0 Special Answer Tags

4.1 NoInput1–3

This is an optional Answer (Agree or Reply), which will be generated by the system if the caller does not respond within a preset interval.

| | |
|---|---|
| Agree | NoInput1 |
| Guidance | I need a response to go ahead |

The NoInput1–3 tags allow for "tapered" help. If NoInput1 is specified, the system responds with appropriate instructions for the Answer. If NoInput2 is specified, the system responds with more detailed instructions for the Answer, giving the caller several chances to respond correctly.

4.2 NoMatch

NoMatch, like NoInput, is also an optional Answer (Agree or Reply) category. Appropriate prompts are played if the caller's response is not understood by the system.

| | |
|---|---|
| Agree | NoMatch |
| Guidance | I'm sorry, I don't think that's one of the choices. For help, say "help." |

NoMatch tags allow for tapered help. If at first, a caller says something unintelligible, the system plays a warning prompt. If a caller's input is still not understood, the system plays a prompt providing more detailed instructions for the Answer, giving the caller several chances to respond correctly.

5.0 Navigation Tags

5.1 Label

Label tags mark points in a topic that can be directly accessed by another topic.

| Label | petunia |
|---|---|
| Guidance | The petunia is good for flower beds |
| Guidance | It grows best in temperate zones |

5.2 Return

Return may be used to make part (but not all) of a topic usable as a library. When a topic with a PlayTopic tag is played, the conversation will return to the calling point at the first Return tag.

A Return tag may be used to mark the point at which the system will return to a calling topic. In the example above, the lines between the Label "petunia" and the Return tag are read before the system returns to the calling topic. Return tags are useful when there is extraneous information in the called file.

5.3 Jump

Jump tags are used to branch to another topic. The Jump tag steers the flow of conversation to the called topic. In the Data column, specify the topic you would like to jump to, or a topic followed by the pound (#) sign and a Label name.

| Jump | Filename#LabelName |
|---|---|
| Jump | Filename |

In this example, a file called STGardening jumps to STFlowers.

| Guidance | I have information on petunias. |
|---|---|
| Jump | STFlowers#petunia |

5.4 PlayTopic

PlayTopic tags are used to branch to another topic and return to the originating topic. This is useful to reuse common topics (or parts of common topics).

After the called file is played, the conversation returns to the calling topic. (The conversation does not return to the calling topic when you use the Jump tag.)

The following is an example of PlayTopic used in a topic called STGardening.

| I have information on petunias. | |
|---|---|
| PlayTopic | STFlowers#petunia |

The conversation returns to STGardening after playing the specified portion of STFlowers. The following Table 3 shows an example of using navigation tags contains two topics, TopicA and TopicB. TopicA references TopicB with PlayTopic by specifying the filename followed by a Label (i.e., Resetting). TopicA returns from TopicB when it reaches the Return Tag. TopicA references the Main Menu with Jump by specifying the filename, NTMainMenu.

TABLE 3

| | Topic A | | Topic B | |
|---|---|---|---|---|
| Guidance | . . . | | Label | Resetting |
| Confirm | Would you like to hear about resetting your PDA? | | Guidance | . . . |
| Agree | yes | | Guidance | . . . |
| PlayTopic | STTopicB#Resetting | | Return | |
| Agree | no | | Guidance | . . . |
| Jump | NTMainMenu | | Guidance | . . . |

6.0 Concept Memory Tags

6.1 Set

The Set tag is used to set a global conversation-wide Concept to an arbitrary string value or expression.

| Set | HaveWeComeHereBefore=yes |
|---|---|

6.2 Clear

This tag is used to clear the value of a Concept to "NotSet".

| Clear | HaveWeComeHereBefore |
|---|---|

6.3 NotSet

NotSet is an Agree category used with a Confirm tag that asks for the value of a Concept. NotSet shows that the first time a Concept is called, it has no value. The following example shows the use of Confirm and Agree while setting a Concept within a topic.

| Confirm | =HaveWeComeHereBefore |
|---|---|
| Agree | NotSet |
| Guidance | Please visit our website |
| Set | HaveWeComeHereBefore=yes |

In this example, the Confirm tag asks for the value of the Concept HaveWeComeHereBefore. If the Concept is NotSet (has no value) then the Guidance prompts the caller to visit a customer website. Once the Guidance prompt has been played, the value of the Concept is set to "yes" using the Set tag.

7.0 Field Tags

7.1 Record

This tag works much like an answering machine recording. The system will record a file to the reporting system to be used for caller feedback, or to collect important problem-related information. The caller is prompted to press the pound (#) key to save the recording. Only one recording per session is allowed.

| | |
|---|---|
| Guidance | Please leave us your comments on this system. Be sure to press the pound key to complete your message |
| Record | |

At block 314 a conversation outline is defined. This may involve manually adding text into the text document. For example, a yes/no question in the document may already have information to be played back to a caller in the event of the caller answering "yes", but may not have information to play back if the caller answers "no". Such a conversation is ill-formed in the sense that no action or information is associated with a particular response by the caller. Thus, at block 314, manual entries comprising information or actions to be taken in response to utterances for which no such actions or information exist may be input by an operator. Once an action or information is input at 314, it is also tagged using the tags defined in the mark-up language. As noted above, each tag is a construct in the mark up language and is used to identify portions of the text document semantically and logically. This allows an interpreter to read the marked-up text document and to automatically generate, for example, Voice XML (VXML) code which can be used to generate a voice user-interface based on the voice content.

At block 316 each prompt is assessed for understandability. It will be appreciated that in order to achieve high speech recognition accuracy, each prompt played to a caller (user) by the voice response system must be understandable. Thus, aspects of block 316 include a review of each prompt using a prompt style checker that has a simplified English grammar. As an example of how the prompt style checker works, consider the prompt "Perform the following process". The juxtaposition of the words "perform" and "process" may lead to confusion on the part of the caller, and thus the prompt style checker would rewrite the prompt to read "Do the following steps", which is simpler and therefore more easily understood. Further, the prompt style checker would replace ambiguous and less frequently used words with clear and more frequently used words. In another embodiment, the prompt style checker reduces lengthy sentences: For example, sentences that exceed a predetermined length would be rewritten in a shorter form. Accordingly, in some cases the prompt style checker includes a summarization engine in order to summarize lengthy sentences. In another embodiment, the prompt style checker rewrites prompts written in the passive tense into the active tense.

In order to achieve higher speech recognition accuracy, the prompt style checker rewrites the prompts in a manner that elicits a crisp or concise response by the caller. For example, a prompt that says "Would you like to speak to A, B, or C" would be rewritten to read, "Choices are A, B, or C". This encourages a caller to utter a concise response by saying one of "A", "B" or "C" instead of saying, "I would like to speak to A, B or C". Thus, the prompts are rewritten by the prompt style checker in order to discourage natural language responses. This is based on the premise that one or two word answers enjoy a higher speech recognition accuracy.

At block 318, choices presented in prompts are assessed for confusability. For example, the words "modem" and "medium" are phonetically very similar and are poor choices to present in a prompt, since the potential that these words would be misrecognized is great. In one embodiment, choices in a prompt are input into a confusability function which determines a metric which provides an indication of confusability. This metric may be used to prompt an operator to offer different choices within the prompt, if the potential for misrecognition is high.

In one embodiment, the confusability function takes as its input two words which are to be assessed for confusability. The function returns a number from 0.0 to 1.0, wherein 0.0 indicates little or no confusability, whereas 1.0 indicates high confusability. In one embodiment, the confusability function performs a dictionary look-up in order to convert words into their phonetic equivalents. For example, if the two words input into the confusability function are "modem" and "medium", then the confusability function would convert "modem" into "mo!*m" which is the phonetic equivalent of "modem" and "medium" into "mi!l*m" which is the phonetic equivalent of "medium", as defined in Nuance Communications, Inc.'s Phonetic Alphabet. Thereafter, the confusability function calculates a set of weights that would distinguish confusability. In one case, a weight that is based on the length of the most common subsequence of phonemes vs. overall sequence length is used. For example, in "modem" and "medium" there are four common phonemes; i.e., m, !, *, and m. The overall average commonality is then (4/5+4/6)/2=0.733.

Another weight could be the commonality of the two initial phonemes of each word (i.e., this is based on the understanding that speech recognition tends to have high emphasis on the first two phonemes). Thus, the words "medium" and "modem" both have a common initial phoneme which is "m". Thus, in one embodiment, a commonality of 0.5 would be assigned to these initial two phonemes.

In another embodiment, phonemes that have a high confusability are allowed to match. In other words, phonemes such as "p" and "p", or "n" and "m", "z" and "c", etc., are each assigned a commonality of 0.5. In yet a further embodiment, certain vowel phonemes are allowed to match. For example, "a" may be matched to "o" and "i" may be matched to "e", etc. Once the set of weights have been determined, then an overall weighting tree is constructed based on the weights. In one embodiment the weighting tree is constructed using Bayesian probability, wherein commonality=(weight factor 1 * weight factor 2 * weight factor 3), etc. In another embodiment the commonality is the simple average of the weight factors.

At block 320, a verification step is performed to verify the content. For example, in one embodiment, a check is performed to verify that that audio has been recorded for each prompt. In another embodiment, a check is performed to determine if some action or information is associated with each choice in a prompt. In other words, at block 320, a check is performed to verify that the content caters for all possible utterances by a user.

Referring again to FIGS. 1 and 2 of the drawings, integration of the voice content as indicated by blocks 104 and 204, may be performed automatically. This is achieved by using a mark-up language interpreter to interpret the marked-up voice content and to automatically generate code which is be used to generate the voice user interface. In one embodiment, the code is written in VXML. This ensures portability across multiple platforms.

Figure 4:
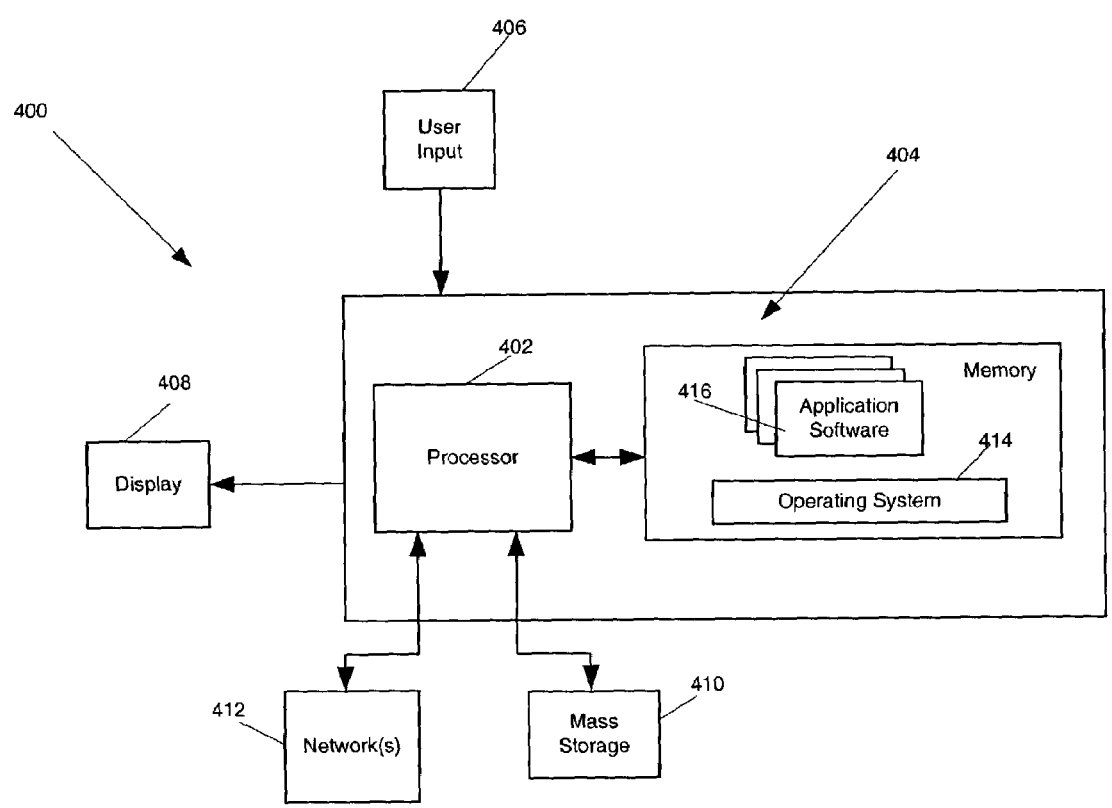
FIG. 4 shows a high-level block diagram of a computer that may be used to implement the methods of FIGS. 1 and 2.

Referring now to FIG. 4 of the drawings, reference numeral 400 generally indicates an example of a processing system that may represent a general purpose computer that may be used to perform the methods described above.

Processing system 400 typically includes at least one processor 402 coupled to a memory 404. Processor 402 may represent one or more processors (e.g. microprocessors), and memory 404 may represent random access memory (RAM) devices comprising a main storage of system 400, as well as any supplemental levels of memory e.g., cache memories, non-volatile or back-up memories (e.g. programmable or flash memories), read-only memories, etc. In addition, memory 404 may be considered to include memory storage physically located elsewhere in system 400, e.g. any cache memory in a processor 402, as well as any storage capacity used as a virtual memory, e.g., as stored on a mass storage device 410 or on another computer coupled to system 400 via network 412.

Processing system 400 also typically receives a number of inputs and outputs for communicating information externally. For interface with a user or operator, system 400 typically includes one or more user input devices 406 (e.g., a keyboard, a mouse, etc.) and a display 408 (e.g., a CRT monitor, a LCD panel). However, with some implementations of system 400, such as in a server, direct local) user input and output may not be required, such that user input devices 406 and display 408 may be omitted.

For additional storage, system 400 may also include one or more mass storage devices 410, e.g., a floppy or other removable disk drive, a hard disk drive, a Direct Access Storage Device (DASD), an optical drive (e.g. a CD drive, a DVD drive, etc.) and/or a tape drive, among others. Furthermore, hardware 400 may include an interface with one or more networks 412 (e.g., a land, a WAN, a wireless network, and/or the Internet among others) to permit the communication of information with other computers coupled to the networks. It should be appreciated that system 400 typically includes suitable analog and/or digital interfaces between processor 402 and each of the components 404, 406, 408 and 412 as is well known in the art.

Processing system 400 operates under the control of an operating system 414, and executes various computer software applications, components, programs, objects, modules, etc. (e.g. a program or module which performs operations as shown in FIGS. 1, 2, and 3 of the drawings). Moreover, various applications, components, programs, objects, etc. may also execute on one or more processors in another computer coupled to system 400 via a network 412, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform these steps necessary to execute steps or elements involving the various aspects of the invention. Moreover, while the invention has been described in the context of fully functioning computers and computer systems, those skilled in the art will appreciate that the various embodiments of the invention are capable of being distributed as a program product in a variety of form, and that the invention applies equally regardless of the particular type of signal bearing media used to actually off the distribution. Examples of signal bearing media include but are not limited to recordable type media such as volatile and non-volatile memory devices, floppy and other removable disks, hard disk drives, optical disks (e.g. CD ROMS, DVDs, etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

APPENDIX 1

Escrow is used to provide payment assurance especially in high value deals.

Under the escrow system, the buyer places payment for an item in trust with the escrow company for a certain fee. The payment is given to the seller once the buyer inspects and approves the item.

Escrow takes the tension out of big money transactions and lowers the risk in letting buyers inspecting the goods before paying.

Check with your escrow service for a list of fees and whether there's a cap on amount of the transaction.

Here's how escrow works in brief.

The buyer and seller agree about the details of a transaction.

The buyer sends payment to a service such as escrow dot com.

Payment is verified and deposited into a trust account.

The seller ships the goods to the buyer, knowing that the buyer's payment is secured.

The buyer accepts the merchandise after having the chance to inspect it.

Escrow dot com pays the seller after all conditions are met.

If you want me to continue with more details about using escrow, just say "yes."

OK. More on escrow. Sellers choose to accept escrow when they list their items for sale. Either buyer or seller can contact the other to propose using escrow. This must be done before the auction closes.

Buyers and sellers must agree on who's to pay for shipping and escrow fees, whether the shipping fees are refundable, the length of the inspection period, and what the conditions are for accepting the item.

Here's what you do when the auction closes. To continue, please state whether you're a buyer or a seller.

OK seller. After payment has been made by the high bidder into the escrow account, it is verified as good funds. This process can take up to seven or eight days, depending on the method of payment.

Next, after your buyer's payment has been secured, you must ship the item.

You must use a traceable shipping method such as FedEx or the postal service. Send the tracking number to the escrow service so they can confirm that the goods have been shipped and received.

After the inspection period, or after the buyer accepts the item, you will be paid in two business days.

If the buyer does not accept the item, the buyer pays the return shipping fees. You have up to five days to examine the item after it is returned.

OK buyer. The first thing you do after winning an auction is to log on to the escrow page and enter the unique item number.

Review your information before submitting it to the escrow service. This includes your address and email.

Next, log in to the escrow site. If you haven't registered already, you will be prompted to do so.

Set down the terms of the escrow process that you've agreed upon with the seller.

Pay your amount into the escrow account using credit card, cashier's check, money order, personal check, or business check.

Once you pay, the item will be shipped to you for inspection.

You must respond before the inspection period closes.

If you accept, the funds are paid to the seller.

If you do not accept the item, you are liable for the return shipping fees and the escrow fees.

This is to discourage casual returns.

APPENDIX 2

```xml
<?xml version="1.0" encoding="UTF-8" ?>
<sxml version="1.0" tagid="1" lastpromptnumber="45">
    STEscrow
    <title audiodirty="false" titledirty="false"
audio="topics/ltescrow/ltescrow__pr0001.wav" tagid="2">
        What+is+escrow%3F
    </title>
    <topictype tagid="3">
        Subject
    </topictype>
    <keygroup tagid="4">
        <key type="noun">verify payment</key>
        <key type="noun">payment</key>
        <key type="noun">escrow</key>
        <key type="noun">payment verification</key>
        <key type="noun">inspection</key>
    </keygroup>
    <essence tagid="5">
        escrow
    </essence>
    <utt type="guidance" audiodirty="false" pause="true" bargein="true"
audio="topics/ltescrow/ltescrow__pr0002.wav" tagid="6">
Escrow+is+used+to+provide+payment+assurance+especially+in+high+value+deals.
    </utt>
    <utt type="guidance" audiodirty="false" pause="true" bargein="true"
audio="topics/ltescrow/ltescrow__pr0004.wav" tagid="7">
Under+the+escrow+system%2C+the+buyer+places+payment+for+an+item+in+trust+with+the+escrow+company+for+a+certain+fee.+The+payment+is+given+to+the+seller+once+the+buyer+inspects+and+approves+the+item.
    </utt>
    <utt type="guidance" audiodirty="false" pause="true" bargein="true"
audio="topics/ltescrow/ltescrow__pr0041.wav" tagid="8">
Escrow+takes+the+tension+out+of+big+money+transactions+and+lowers+the+risk+in+letting+buyers+inspecting+the+goods+before+paying.
    </utt>
    <utt type="guidance" audiodirty="false" pause="true" bargein="true"
audio="topics/ltescrow/ltescrow__pr0008.wav" tagid="9">
Check+with+your+escrow+service+for+a+list+of+fees+and+whether+there%27s+a+cap+on+amount+of+the+transaction.
    </utt>
    <utt type="guidance" audiodirty="false" pause="true" bargein="true"
audio="topics/ltescrow/ltescrow__pr0009.wav" tagid="10">
        Here%27s+how+escrow+works+in+brief.
    </utt>
    <utt type="guidance" audiodirty="false" pause="true" bargein="true"
audio="topics/ltescrow/ltescrow__pr0010.wav" tagid="11">
        The+buyer+and+seller+agree+about+the+details+of+a+transaction.
    </utt>
    <utt type="guidance" audiodirty="false" pause="true" bargein="true"
audio="topics/ltescrow/ltescrow__pr0012.wav" tagid="12">
        The+buyer+sends+payment+to+a+service+such+as+escrow+dot+com.
    </utt>
    <utt type="guidance" audiodirty="false" pause="true" bargein="true"
audio="topics/ltescrow/ltescrow__pr0013.wav" tagid="13">
        Payment+is+verified+and+deposited+into+a+trust+account.
    </utt>
    <utt type="guidance" audiodirty="false" pause="true" bargein="true"
audio="topics/ltescrow/ltescrow__pr0041.wav" tagid="14">
```

APPENDIX 2-continued

```
The+seller+ships+the+goods+to+the+buyer%2C+knowing+that+the+buyer%27s+payment+is+
secured.
        </utt>
        <utt type="guidance" audiodirty="false" pause="true" bargein="true"
audio="topics/ltescrow/ltescrow_pr0015.wav" tagid="15">
            The+buyer+accepts+the+merchandise+after+having+the+chance+to+inspect+it.
        </utt>
        <utt type="guidance" audiodirty="false" pause="true" bargein="true"
audio="topics/ltescrow/ltescrow_pr0016.wav" tagid="16">
            Escrow+dot+com+pays+the+seller+after+all+conditions+are+met.
        </utt>
        <question type="confirm" audiodirty="false"
audio="topics/ltescrow/ltescrow_pr0017.wav" tagid="17">
If+you+want+me+to+continue+with+more+details+about+using+escrow%2C+just+say+%22ye
s.%22
            <answer tagid="18" type="Agree">
                <key>yes</key>
                <utt type="task" audiodirty="false" pause="true" bargein="true"
audio="topics/ltescrow/ltescrow_pr0018.wav" tagid="19">
OK.+More+on+escrow.+Sellers+choose+to+accept+escrow+when+they+list+their+items+fo
r+sale.+Either+buyer+or+seller+can+contact+the+other+to+propose+using+escrow.+Thi
s+must+be+done+before+the+auction+closes.
                </utt>
                <utt type="task" audiodirty="false" pause="true" bargein="true"
audio="topics/ltescrow/ltescrow_pr0020.wav" tagid="20">
Buyers+and+sellers+must+agree+on+who%27s+to+pay+for+shipping+and+escrow+fees%2C+w
hether+the+shipping+fees+are+refundable%2C+the+length+of+the+inspection+period%2C
+and+what+the+conditions+are+for+accepting+the+item.
                </utt>
                <question type="ask" audiodirty="false"
audio="topics/ltescrow/ltescrow_pr0021.wav" tagid="21">
Here%27s+what+you+do+when+the+auction+closes.+To+continue%2C+please+state+whether
+you%27re+a+buyer+or+a+seller.
                    <answer tagid="22" type="Reply">
                        <key>selling</key>
                        <utt type="guidance" audiodirty="false" pause="true"
bargein="true" audio="topics/ltescrow/ltescrow_pr0022.wav" tagid="23">
OK+seller.+After+payment+has+been+made+by+the+high+bidder+into+the+escrow+account
%2C+it+is+verified+as+good+funds. This+process+can+take+up+to+seven+or+eight+days
%2C+depending+on+the+method+of+payment.
                        </utt>
                        <utt type="task" audiodirty="false" pause="true"
bargein="true" audio="topics/ltescrow/ltescrow_pr0024.wav" tagid="24">
Next%2C+after+your+buyer%27s+payment+has+been+secured%2C+you+must+ship+the+item.
                        </utt>
                        <utt type="task" audiodirty="false" pause="true"
bargein="true" audio="topics/ltescrow/ltescrow_pr0025.wav" tagid="25">
You+must+use+a+traceable+shipping+method+such+as+FedEx+or+the+postal+service.+Sen
d+the+tracking+number+to+the+escrow+service+so+they+can+confirm+that+the+goods+ha
ve+been+shipped+and+received.
                        </utt>
                        <utt type="guidance" audiodirty="false" pause="true"
bargein="true" audio="topics/ltescrow/ltescrow_pr0026.wav" tagid="26">
After+the+inspection+period%2C+or+after+the+buyer+accepts+the+item%2C+you+will+be
+paid+in+two+business+days.
                        </utt>
                        <utt type="guidance" audiodirty="false" pause="true"
bargein="true" audio="topics/ltescrow/ltescrow_pr0028.wav" tagid="27">
If+the+buyer+does+not+accept+the+item%2C+the+buyer+pays+the+return+shipping+fees.
+You+have+up+to+five+days+to+examine+the+item+after+it+is+returned.
                        </utt>
                    </answer>
                    <answer tagid="28" type="Reply">
                        <key>buying</key>
                        <key>bidding</key>
                        <utt type="task" audiodirty="false" pause="true"
bargein="true" audio="topics/ltescrow/ltescrow_pr0029.wav" tagid="29">
OK+buyer.+The+first+thing+you+do+after+winning+an+auction+is+to+log+on+to+the+esc
row+page+and+enter+the+unique+item+number.
                        </utt>
                        <utt type="task" audiodirty="false" pause="true"
bargein="true" audio="topics/ltescrow/ltescrow_pr0042.wav" tagid="30">
Review+your+information+before+submitting+it+to+the+escrow+service.+This+includes
+your+address+and+email.
                        </utt>
                        <utt type="task" audiodirty="false" pause="true"
```

APPENDIX 2-continued

```
bargein="true" audio="topics/ltescrow/ltescrow_pr0032.wav" tagid="31">
Next%2C+log+in+to+the+escrow+site.+If+you+haven%27t+registered+already%2C+you+wil
l+be+prompted+to+do+so.
                </utt>
                <utt type="task" audiodirty="false" pause="true"
bargein="true" audio="topics/ltescrow/ltescrow_pr0033.wav" tagid="32">
Set+down+the+terms+of+the+escrow+process+that+you%27ve+agreed+upon+with+the+selle
r.
                </utt>
                <utt type="task" audiodirty="false" pause="true"
bargein="true" audio="topics/ltescrow/ltescrow_pr0034.wav" tagid="33">
Pay+your+amount+into+the+escrow+account+using+credit+card%2C+cashier%27s+check%2C
+money+order%2C+personal+check%2C+or+business+check.
                </utt>
                <utt type="guidance" audiodirty="false" pause="true"
bargein="true" audio="topics/ltescrow/ltescrow_pr0036.wav" tagid="34">
Once+you+pay%2C+the+item+will+be+shipped+to+you+for+inspection.
                </utt>
                <utt type="task" audiodirty="false" pause="true"
bargein="true" audio="topics/ltescrow/ltescrow_pr0037.wav" tagid="35">
            You+must+respond+before+the+inspection+period+closes.
                </utt>
                <utt type="guidance" audiodirty="false" pause="true"
bargein="true" audio="topics/ltescrow/ltescrow_pr0038.wav" tagid="36">
            If+you+accept%2C+the+funds+are+paid+to+the+seller.
                </utt>
                <utt type="guidance" audiodirty="false" pause="true"
bargein="true" audio="topics/ltescrow/ltescrow_pr0045.wav" tagid="37">
If+you+do+not+accept+the+item%2C+you+are+liable+for+the+return+shipping+fees+and+
the+escrow+fees.
                </utt>
                <utt type="guidance" audiodirty="false" pause="true"
bargein="true" audio="topics/ltescrow/ltescrow_pr0040.wav" tagid="38">
                This+is+to+discourage+casual+returns.
                </utt>
            </answer>
        </question>
    </answer>
    <answer tagid="39" type="Agree">
        <key>no</key>
    </answer>
    </question>
</sxml>
```

What is claimed is:

1. A method for building a voice response system, the method comprising:

defining an interaction between the voice response system and a user, the interaction comprising text elements to be played to the user and utterances to be spoken by the user, the text elements and the utterances being arranged in a form of a pseudo-dialog wherein the text elements to be played in response to an utterance are identified, said defining the interaction comprising automatically generating at least some of the text elements by automatically generating topic elements from text of a natural language text document by partitioning the text document into topics based on a frequency of occurrence of nouns therein, wherein each topic element comprises a subsection of the text document that relates to a particular topic; and automatically generating code that uses the interaction to create a voice user-interface.

2. The method of claim 1, further comprising generating keywords for each topic based on a frequency of occurrence of words in the text of a topic, the code then comprising instructions to select that topic to be played which has a keyword that matches an utterance of the user.

3. The method of claim 2, wherein the utterance of the user comprises a word pattern that includes the keyword.

4. The method of claim 2, wherein the text elements comprise navigation elements that include disambiguating questions to be played to the user in the event of the word pattern uttered by the user matching a keyword for more than one topic.

5. The method of claim 4, wherein automatically generating at least some of the text elements comprises automatically generating the navigation elements, wherein each disambiguating question is based on the most frequently occurring mutually exclusive noun from the text of the topics that have matching keywords.

6. The method of claim 1, wherein the text elements comprised prompts to be played to the user, the method further comprising rewriting the prompt to increase a likelihood of it being understood by the user.

7. The method of claim 6, wherein the rewriting comprises rewriting the prompt so that it is in the active tense.

8. The method of claim 6, wherein rewriting each prompt comprises replacing ambiguous and less frequently used words therein with clear and more frequently used words.

9. The method of claim 6, wherein the rewriting comprises shortening the prompt if it exceeds a predetermined number of words.

10. The method of claim 6, further comprising analyzing each prompt to determine a probability of an utterance by the user in response to the prompt being recognized; and notifying an operator if the probability is low.

11. The method of claim 10, wherein the analyzing comprises determining a phonetic composition of choices presented to the user in each prompt in order to determine a likelihood of the choices being mis-recognized.

12. A method for building a voice response system, the method comprising:
   developing voice content for the voice response system, the voice content including prompts and information to be played to a user, said developing comprising reading a natural language text document and automatically generating topics therefrom corresponding to the information to be played to the user based on a frequency of occurrence of nouns in the text document; and
   integrating the voice content with logic to define a voice user-interface that is capable of interacting with the user in a manner of a conversation in which the voice user-interface receives an utterance from the user and presents a selection of the voice content to the user in response to the utterance.

13. The method of claim 12, wherein the integrating is automatically performed.

14. The method of claim 13, further comprising automatically associating a keyword with each topic which when uttered by the user cause the voice user-interface to play the topic associated with the uttered keyword.

15. The method of claim 14, wherein if a keyword is associated with more than one topic, automatically generating a disambiguating prompt to played to the user to elicit an utterance of a keyword that is exclusively associated with one of the topics.

16. A computer readable medium having stored thereon a sequence of instructions, which when executed by a computer cause the computer to perform a method for building a voice response system, the method comprising:
   defining an interaction between the voice response system and a user, the interaction comprising text elements to be played to the user and utterances to be spoken by the user, the text elements and the utterances being arranged in a form of a pseudo-dialog wherein the text elements to be played in response to an utterance are identified, said defining the interaction comprising automatically generating at least some of the text elements by automatically generating topic elements from text of a natural language text document by partitioning the text document into topics based on a frequency of occurrence of nouns therein, wherein each topic element comprises a subsection of the text document that relates to a particular topic; and
   automatically generating code that uses the interaction to create a voice user-interface.

17. A computer readable medium having stored thereon a sequence of instructions which when executed by a computer cause the computer to perform a method for building a voice response system, the method comprising:
   developing voice content for the voice response system, the voice content including prompts and information to be played to a user, said developing comprising reading a natural language text document and automatically generating topics therefrom corresponding to the information to be played to the user based on a frequency of occurrence of nouns in the text document; and
   integrating the voice content with logic to define a voice user-interface that is capable of interacting with the user in a manner of a conversation in which the voice user-interface receives an utterance from the user and presents a selection of the voice content to the user in response to the utterance.

18. The computer readable medium of claim 17, wherein the integrating is automatically performed.

19. A voice response system, comprising:
   a processor; and
   a memory coupled to the processor, the memory storing instructions which when executed by the processor cause the voice response system to perform a method comprising:
      defining an interaction between the voice response system and a user, the interaction comprising text elements to be played to the user and utterances to be spoken by the user, the text elements and the utterances being arranged in a form of a pseudo-dialog wherein the text elements to be played in response to an utterance are identified, said defining the interaction comprising automatically generating at least some of the text elements by automatically generating topic elements from text of a natural language text document by partitioning the text document into topics based on a frequency of occurrence of nouns therein, wherein each topic element comprises a subsection of the text document that relates to a particular topic; and
      automatically generating code that uses the interaction to create a voice user-interface.

20. The system of claim 19, wherein the method further comprises generating keywords for each topic based on a frequency of occurrence of words in the text of a topic, the code then comprising instructions to select that topic to be played which has a keyword that matches an utterance of the user.

21. A voice response system, comprising:
   a processor; and
   a memory coupled to the processor, the memory starting instructions which when executed by the processor cause the voice response system to perform a method comprising:
      developing voice content for the voice response system, the voice content including prompts and information to be played to a user, said developing comprising reading a natural language text document and automatically generating topics therefrom corresponding to the information to be played to the user based on a frequency of occurrence of nouns in the text document; and
      integrating the voice content with logic to define a voice user-interface that is capable of interacting with the user in a manner of a conversation in which the voice user-interface receives an utterance from the user and presents a selection of the voice content to the user in response to the utterance.

22. The system of claim 21, wherein the integrating is automatically performed.

* * * * *